United States Patent [19]

Bartholomew

[11] Patent Number: 5,497,414
[45] Date of Patent: Mar. 5, 1996

[54] TELEPHONE SYSTEM PROCESSING OF DESIGNATED CALLER ID PRIVATE CALLS

[75] Inventor: Dale L. Bartholomew, Vienna, Va.

[73] Assignee: Bell Atlantic Network Services, Inc., Arlington, Va.

[21] Appl. No.: 237,987

[22] Filed: May 4, 1994

[51] Int. Cl.$^6$ .......................... H04M 1/56; H04M 15/06; H04M 3/42
[52] U.S. Cl. .............................................. 379/142; 379/201
[58] Field of Search ................................ 379/67, 88, 127, 379/142, 201, 202, 210, 211

[56] References Cited

U.S. PATENT DOCUMENTS

| | | |
|---|---|---|
| 4,551,581 | 11/1985 | Doughty . |
| 5,033,076 | 7/1991 | Jones et al. . |
| 5,054,055 | 10/1991 | Hanle et al. . |
| 5,161,181 | 11/1992 | Zwick . |
| 5,163,087 | 11/1992 | Kaplan .................................. 379/142 X |
| 5,247,571 | 9/1993 | Kay et al. . |
| 5,341,414 | 8/1994 | Popke ...................................... 379/142 |
| 5,361,295 | 11/1994 | Solomon et. al. ................... 379/202 X |

Primary Examiner—Stephen Chin
Assistant Examiner—Paul Loomis
Attorney, Agent, or Firm—Lowe, Price, LeBlanc & Becker

[57] ABSTRACT

Telephone subscribers are provided wide flexibility to pre-designate criteria by which incoming calls having blocked caller ID status are processed, the mode of processing including call blocking, call completion, and call forwarding alternatives. Originating calls are submitted to processing supervision of an Advanced Intelligent Network (AIN) in response to caller ID block initiating triggers in originating switching systems. Upon triggering, the AIN network will access a call processing record (CPR) associated with the caller and/or the called party that is stored remotely at the AIN Integrated Services Control Point (ISCP). Determination of call processing is thus made as a network feature rather than as a switch feature.

15 Claims, 8 Drawing Sheets

TELEPHONE SYSTEM PROCESSING OF DESIGNATED CALLER ID PRIVATE CALLS

TECHNICAL FIELD

The present invention relates to telephone system processing of calls having Individual Caller Line Identification (caller ID) privacy feature designations and, more particularly, to adding flexibility in control of access for called parties while protecting privacy of caller parties.

BACKGROUND ART

Caller ID is a telephone on-hook capability that provides a called party with information about the caller before the incoming call is answered. Conventionally, such information includes the date and time of the call and the caller's telephone number. A data message, preceded by a channel seizure signal, is sent in conjunction with the ringing signal from the central office to the called party during the silent interval after the first 20-Hz, 2-second ringing phase.

Caller ID service is designed for use with the voice portion of existing loop connections. The digitally formatted message is transmitted through a stream of data bits of standardized digital format. The message is sent once, without retransmission capability. The channel seizure signal, sent at the beginning of each message to alert the called party equipment of the coming information through physical connection of an appropriate interface, is typically composed of thirty continuous bytes of octal 125 (i.e., 01010101), or 250 milliseconds of a 600-Hz square wave. Transmission of data follows thereafter and is completed prior to the next 20-Hz ringing signal. For a detailed description of the method and apparatus for sending the data message, reference is made to U.S. Pat. No. 4,551,581 issued to Doughty on Nov. 5, 1985.

From the standpoint of a called party subscriber, the caller ID service offers several advantages. Identification of the calling party, as provided by the caller ID service, allows the called party to screen an incoming call personally before its completion and thereby to decide whether or not it is desirable to answer the call. Nuisance calls, such as advertising and solicitation calls, can be avoided if the identity of the caller is determined beforehand. Knowledge of caller identity also serves as a resource for dealing with and curtailing harassment calls.

The caller ID service can be made interactive with a personal computer at the subscriber's station to generate prescribed information related to the calling party for display on the computer monitor as the incoming telephone call is received. Such information can be available thereafter for general operation at the control of the user. A log of caller ID information transmitted with incoming calls over a desired time period may be stored, the information thereby available for future processing. Reference is made to made to U.S. Pat. No. 5,054,055, issued to Hanle et al. on Oct. 1, 1991 for a more detailed description of the intelligent use of caller ID information.

Despite its many favorable aspects, caller ID has raised objections with respect to callers' rights of privacy. If the caller number identity is made known to a called party caller ID subscriber each time a call is made, the privacy afforded to a caller having an unlisted number is significantly compromised. Similarly, any caller may find it desirable to place a call without revealing origination identity to the called party. In such case, the caller must take the risk that the called party line does not subscribe to the caller ID service.

In order to accommodate caller privacy, subscribers have been offered a caller ID block service, whereby the identity of the line originating a call will not be transmitted to the called party. If the called party is an caller ID service subscriber, the display unit will either indicate a caller privacy condition or remain blank. Reference is made to U.S. Pat. No. 5,161,181, issued to Zwick on Nov. 3, 1992, for discussion of this concept. With caller ID blocked, a call is directed to the called party for completion in the standard manner and the functionality of caller ID is lost.

U.S. Pat. No. 5,033,076, issued to Jones et al. on Jul. 16, 1991, proposes to provide a service in which incoming calls to the service customers are screened so that only calls from callers who are willing to have their telephone numbers identified will be received. Such provision would restore protection against nuisance and harassment calls of unidentified origin. In operation, the originating switching system checks each incoming call to determine whether the number of the caller line station is maintained in a privacy status. Such status may be stored in the originating switching system. A standard SS7 message, including a designation of privacy status, is sent to the terminating switch. If the called station will only accept calls from callers willing to provide identification, as recorded in the terminating switch, calls having the privacy status will be blocked from completion, at least temporarily. A message may be sent from either the terminating switch or the originating switch to the caller permitting the caller to override the privacy status for the call.

While the Jones arrangement provides a measure of access protection to the called customer as well as privacy protection to the calling customer, the system lacks flexibility due to functional limitations of the switches. Except for the special case in which the called party is a specified public service facility, there is no treatment for informing the called party that a call from a privacy status caller has been attempted. That is, the Jones system basically treats each such privacy status call as a nuisance or harassment call, blocking completion to the called party.

Further, in the Jones system, considerable additional message transmission signaling is required between the originating and terminating switch for status determination at each end, override prompt announcement, and caller response.

An additional aspect to which the Jones system is not directed is the treatment of caller ID privacy calls in relation to voice messaging. As the number of subscriber message mailboxes continues to increase, the number of advertising messages, the equivalent to "junk mail," delivered to mailboxes becomes a greater nuisance, proliferated by the ability to simultaneously transmit a message for "broadcast" delivery to a plurality of mailboxes. Providing the mail box subscriber with the ability to block such messages, sent from unidentified origin, would alleviate this nuisance problem.

Conversely, forwarding a caller ID privacy call, directed initially to the line of a caller ID subscriber, to a mail box would offer the called party the ability to obtain a message from the caller without having to interact with the caller on line at the time of the call. The called party thus would be spared the potential annoyance of participating in unwanted calls while avoiding the loss of unidentified desirable communications.

Disclosure of the Invention

Accordingly, one object of the invention is to provide greater flexibility in controlling completion of caller ID privacy calls while limiting the signaling traffic burdens and functionality burdens imposed on the switching systems.

Another object of the invention is to permit telephone subscribers to predesignate criteria by which incoming calls having blocked caller ID status are processed, the mode of processing including call blocking, call completion, and call forwarding alternatives.

A further object of the invention is to permit telephone subscribers to predesignate criteria by which their outgoing calls automatically will have caller ID privacy status overridden.

The above and other objects of the invention are satisfied in part by submitting originating calls to processing supervision of an Advanced Intelligent Network (AIN) in response to caller ID block initiating triggers in originating switching systems, i.e., at switch central offices associated with the caller lines. Upon triggering, the AIN network will access a call processing record (CPR) associated with the caller and/or the called party that is stored remotely at the AIN Integrated Services Control Point (ISCP). Determination of call processing is thus made as a network feature rather than as a switch feature.

The caller's CPR may include a list of destination telephone numbers for which the caller ID block status is to be overridden, as previously compiled by the caller subscriber. Outgoing calls addressed to numbers that match those in the accessed caller CPR will thus carry origination identification and be completed to caller ID subscribers. Calls to non-matching number destinations will maintain their private origination identification status.

The called party's CPR may contain a list of origination telephone numbers from whom incoming calls having a designated caller ID privacy status are to be treated in a specified manner. For example, listed numbers and ten digit long distance numbers may be denoted for completion despite the lack of caller ID information. Other listed numbers may be denoted for forwarding to the subscriber's voice mail location. Calls from nonlisted numbers would be blocked. Optionally, all incoming calls lacking caller ID information may be denoted for forwarding to a voice mail location. The CPR may alternatively be configured for blocking all private caller ID calls without forwarding.

The AIN network may include a CPR associated with a voice mail address. In the same manner as discussed above, the CPR may contain criteria for blocking calls from, or completing calls to, the voice mail if those calls are attributed a caller ID privacy status.

As an alternative to, or in addition to, a table of identified originating numbers, the called party CPR may denote one or more passwords or PIN numbers associated with respective call routing modes. An initiating trigger to the ISCP, based on a caller ID privacy status, would elicit a message from the ISCP to the originating switch to transmit an announcement to the caller. The announcement would prompt the caller to verbally supply a password or enter a PIN number. If the password or PIN number response corresponds to the called party's CPR, the call will be completed or forwarded appropriately in accordance with its association in the CPR. If there is no such correspondence, the call will be blocked. An announcement explaining the call disconnection may be sent to the calling party.

Additional objects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BEST MODE FOR CARRYING OUT THE INVENTION

Figure 1:
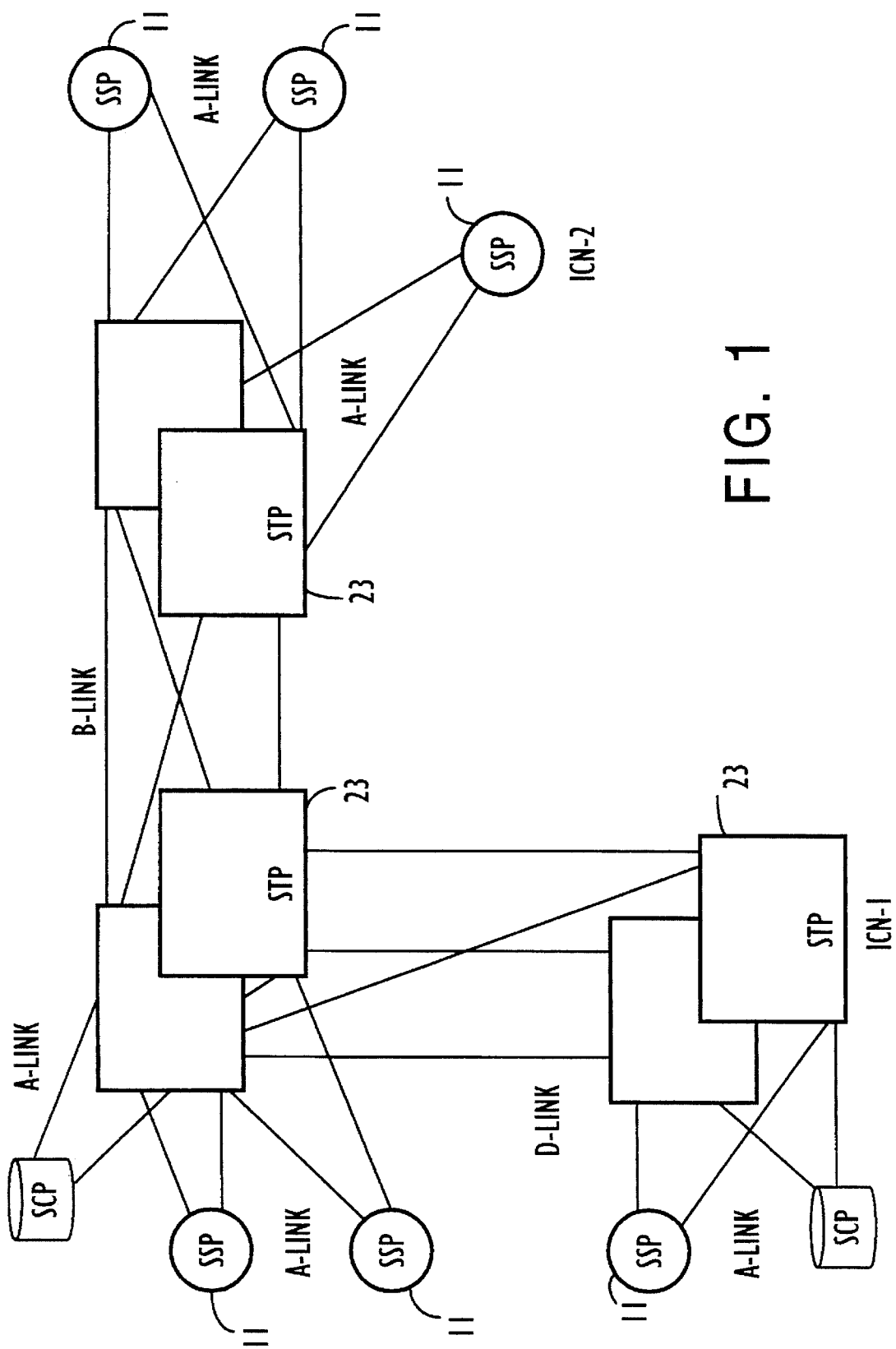
FIG. 1 is a diagram representing a common channel signaling network serving a large geographical area.

FIG. 1 is a diagram of a common channeling signaling network using SS7 protocol. Common channel signaling uses an out of band signaling path that is separate from the path used for voice transmission. This signalling technology provides for faster call set-up times and a more efficient use of the voice network than prior manual signaling, dial pulse signaling or multi-frequency signaling schemes wherein the trunk connecting the calling and the called subscribers required both signaling and voice transmission over the same circuitry. When a call is placed, the voice communication is suspended while signaling is transmitted through the common channel signaling network to check whether the line at the destination switch is busy and to determine the voice connection path.

FIG. 1 depicts a network covering a large geographic area including several interconnect network portions denoted, for example, as ICN-1 and ICN-2. Local telephone lines are connected by individual telephone stations in each geographic area to a Service Switching Point (SSP) which may be included in the closest CO. Each CO connects via trunk circuits (not shown) to one or more of the other COs, and each CO has a CCIS data link to a Switching Transfer Point (STP) 23. Redundant STPs are provided for backup reliability. The trunk circuits carry large numbers of telephone calls between the CO's.

Control logic and feature data are located at Service Control Point (SCP) 43, a centralized node in the network. SSPs communicate with the SCP through the associated STP. B-link or D-link lines interconnect STPs, while A-link lines interconnect the STPs with either SCPs or SSPs.

If a call requires a feature service such as, for example, call redirection, an SSP is triggered to communicate with an SCP on the basis of the call characteristics, such as originating line or dialed digits. If a trigger occurs, a query message is sent to the SCP to obtain instructions. The SCP, if provided with appropriate data base storage and processing capability, can determine the nature of the service and information appropriate to routing of the call. Redirection of the call can be signaled through the STP(s) to seize a trunk circuit between the originating CO and the redirected destination CO. A detailed description of the Common Channel Signaling Network is provided in commonly assigned copending application to Eugene M. Pester, Ser. No. 08/180, 457, filed Feb. 16, 1993, which application is hereby incorporated by reference.

Figure 2:
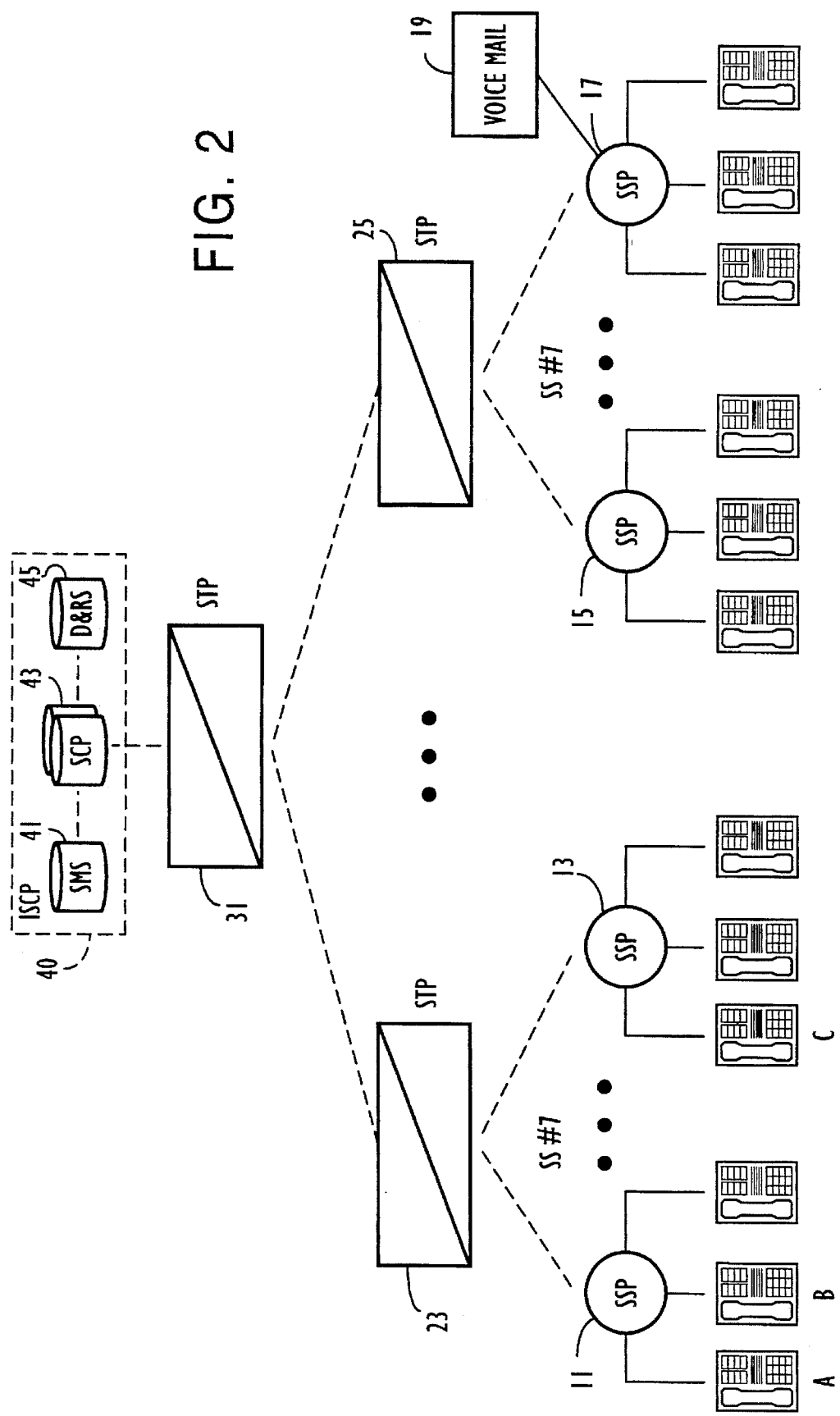
FIG. 2 is a schematic block diagram of the components of an Advanced Intelligent Network system corresponding to portion of the network shown in FIG. 1, shown in somewhat more detail, according to the invention.

FIG. 2 is a schematic block diagram of the components of an Advanced Intelligent Network (AIN) in accordance with the invention. The SCP 43 is part of a control node having enhanced capabilities to be described in more detail hereinafter. Such enhanced capabilities permit a wider variety of communication features and service control. Calls subject to enhanced features contain information which enable the AIN network to trigger the enhanced operation, such as call redirection, and are hereinafter termed "AIN type calls."

All of the CO's 11, 13, 15 and 17 in the embodiment of FIG. 2 are equipped and programmed to serve as SSPs. Such central office switching systems typically consist of a programmable digital switch with CCIS communications capabilities. One example of such a switch is a 5ESS type switch manufactured by AT&T. Other vendors, such as Northern Telecom and Siemens, manufacture comparable digital switches. SSPs are appropriately equipped programmable switches present in the telephone network, which recognize AIN type calls, launch queries to the ISCP and receive commands and data from the ISCP to further process the AIN calls. In instances in which the SSP functionality is not present in the CO, end offices without such functionality forward calls to an SSP at its prescribed point in the network.

The SSPs 11 and 13 connect to a first local area STP 23, and the SSPs 15 and 17 connect to a second local area STP 25. The connections to the STPs are for signalling purposes. As indicated by the black dots below STPs 23 and 25, each local area STP can connect to a large number of SSPs. Although not shown in FIG. 2, as in FIG. 1, the central offices or SSPs are interconnected to each other by trunk circuits for carrying telephone services. Each SSP can be connected to a voice mail facility to serve subscriber lines associated with the SSP. For illustrative purpose, voice mail block 19 is shown connected to SSP 17.

The local area STPs 23 and 25, and any number of other such local area STPs, shown as black dots between STP's 23 and 25, communicate with an STP 31 associated directly with an ISCP 40 to serve the entire area. The STP hierarchy can be expanded or contracted to as many levels as needed to serve appropriately subscriber demand. The links 23 and 25 between the COs and the local area STPs are dedicated CCIS links, typically SS7 type interoffice data communication channels. The local area STPs are in turn connected to each other and to the regional STP 31 via a packet switched network. The regional STP 31 also communicates with the ISCP 40 via a packet switched network.

The ISCP 40 is an integrated system. Among other system components, the ISCP 40 includes a Service Management System (SMS) 41, a Data and Reporting System (DRS) 45 and the actual data base or Service Control Point (SCP) 43. The ISCP also typically includes a terminal subsystem referred to as a Service Creation Environment or SCE (not shown) for programming the data base in the SCP 43 for the services subscribed to by each individual business customer.

The messages transmitted between the SSPs and the ISCP are all formatted in accord with the Transaction Capabilities Applications Protocol (TCAP). The TCAP protocol provides standardized formats for various query and response messages. Each query and response includes data fields for a variety of different pieces of information relating to the current call. An initial TCAP query from an SSP includes, among other data, a "Service Key" which is the calling party's address and digits representing the called party address. The TCAP specifies a number of additional message formats, for example a format for a subsequent query from the SSP, and formats for "INVOKE" responses for instructing the SSP to play an announcement or to play an announcement and collect digits.

Each central office switching system normally responds to a service request on a local communication line connected thereto to selectively connect the requesting line to another selected local communication line. The connection can be made locally through only the connected central office switching system if the originating location and the destination location are served by the same central office switch. For example, for a call from station A to station B the SSP 11 provides the call connection without any connection to another central office. When the called line connects to a distant station, for example when station A calls station C, the connection is made through the connected central office switching system SSP 11 and at least one other central office switching system SSP 13 through the telephone trunks interconnecting the two COs.

Although shown as telephones in FIG. 2, the terminals can comprise any communication device compatible with the line. Where the line is a standard voice grade telephone line, for example, the terminals could include facsimile devices, modems etc.

Figure 3:
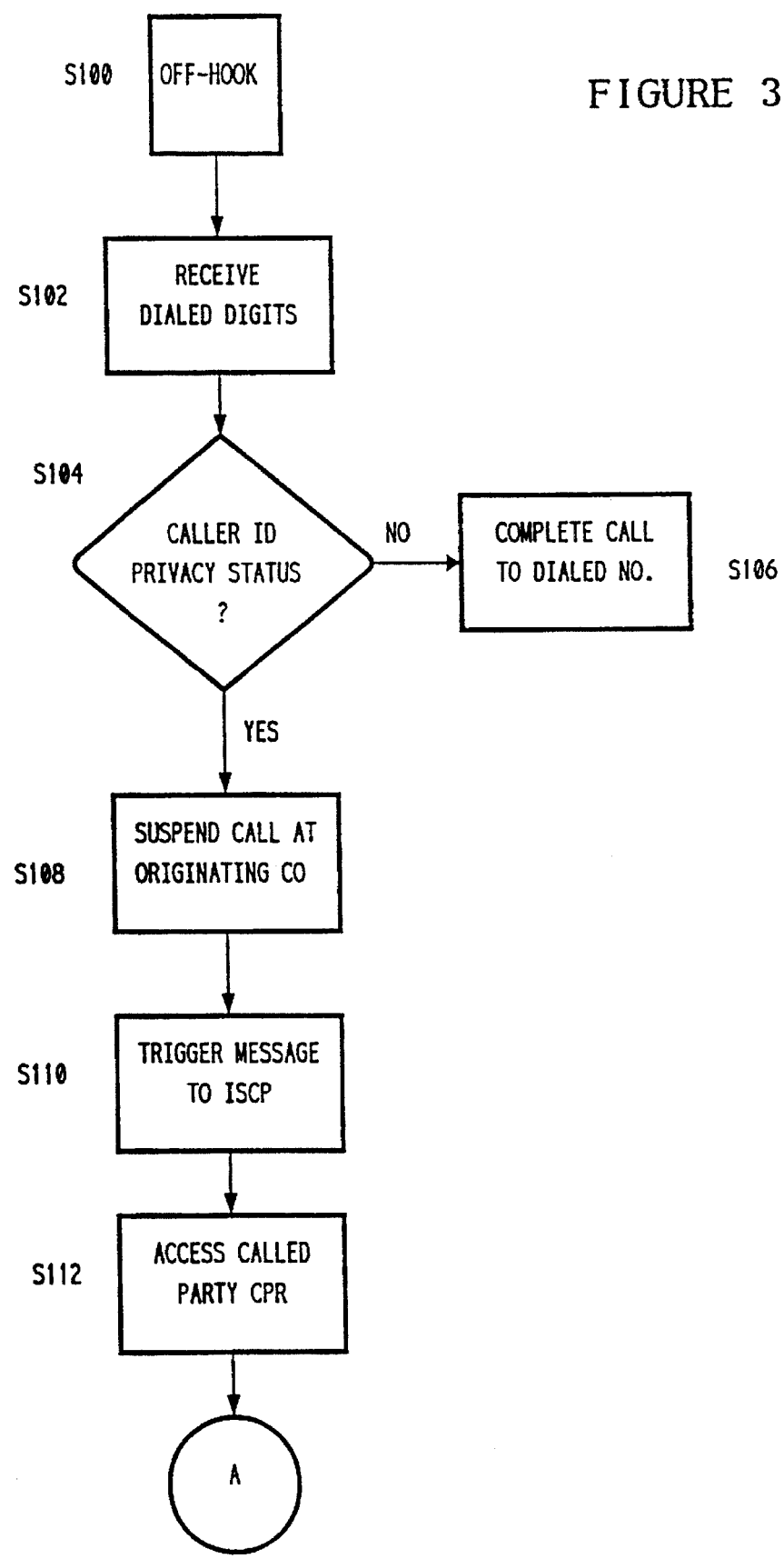
FIG. 3 is a flow chart showing call processing operation based on the presence of caller privacy status.

Operation of the AIN system for handling caller ID privacy status calls in accordance with the invention is described with reference to the flow charts shown in FIGS. 3 through 5. As shown in FIG. 3, at step S100 a caller initiates a call by going off-hook and dialing digits of the called party destination. At step S102 the dialed digits are received at the originating central switching office (CO), which determines at step S104 whether a caller ID block has been set at the switch for the caller party line. If there is no privacy status, the call is processed at step S106 in standard fashion, i.e., without invoking a trigger to the AIN ISCP.

If a privacy status has been determined in step S104, the call is suspended at the originating CO in step S108, and a message is triggered in step S110 and transmitted to the ISCP. The ISCP uses the received dialed digits to access the call processing record (CPR) of the called party to determine the manner in which the call is to be handled. Point A in the flow chart represents this stage at which the flexibility of the invention is manifested.

Figure 4A:
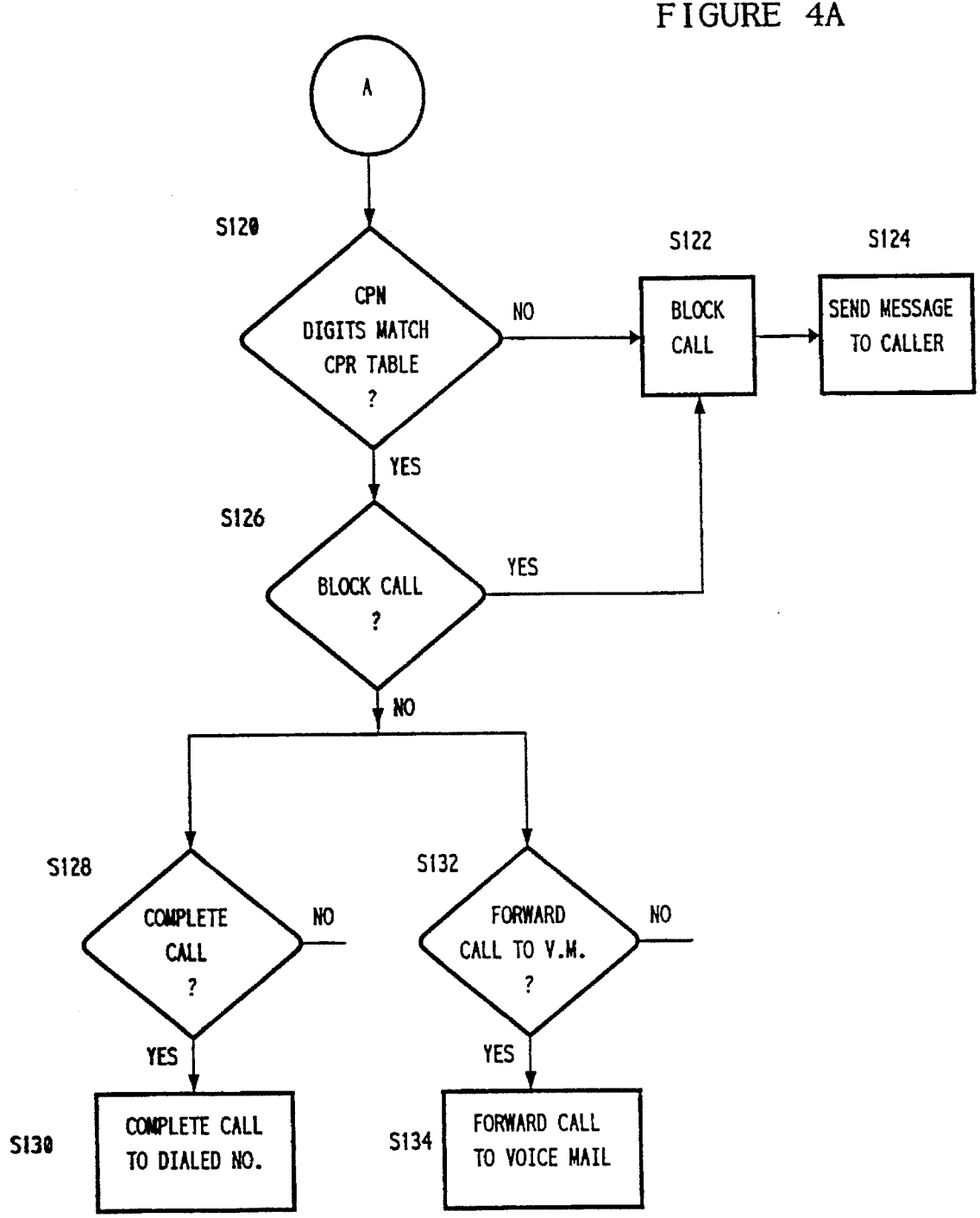
FIG. 4A is a flow chart in furtherance of FIG. 3, showing call processing operation on the basis of matching the caller party number (CPN) digits with a table in the called party CPR.

In accordance with the invention, the subscriber can customize the call treatment in a variety of ways by selecting the content of tables in the associated CPR. FIGS. 4A through 4D represent call processing operations for respective CPR arrangements preselected by the subscriber. As shown in FIG. 4A following point A of FIG. 3, at step S120 a determination is made whether the calling party number (CPN) is listed in the called party's CPR. It should be noted that, while caller ID information will not be transmitted to the called party if the call maintains a privacy status, the CPN is tracked by the system. If there is no match in step S120, the call will be blocked at step S122 and a message will be sent to the caller giving notification that the call will not be completed, step S124. The message may be generated by the originating CO switch or by a remote peripheral unit under network control of the ISCP.

If a match has been determined at step S120, a determination is made whether the CPN is designated in the CPR as a blocked number. The ability to specify numbers to be blocked in the CPR allows the subscriber to avoid in advance calls from known sources of nuisance or harassment. The use of the CPN to indicate call blocking is particularly pertinent if a caller gains access to a valid PIN number or password. If step S126 determines a block call, the aforementioned steps S122 and S124 are performed, whereby the call is terminated with a message to the caller.

If step S126 has not determined that the call is to be blocked, two general alternatives are provided. At step S128 a determination is made whether the CPN is associated in the CPR table with completion to the subscriber number. If such determination is made, the call is so completed at step S130. In this mode, the called party can be assured of receiving calls from known acquaintances who may be privacy subscribers while foregoing receipt of calls from other privacy subscribers.

Alternatively, the CPR table may associate the CPN with forwarding the call to the voice mail of the called party. If such a determination is made at step S132 the call will be completed to the voice mail at step S134. The called party can then receive message information from the call at his/her leisure, without having to interact with the caller on line at the time of the call.

The flexibility of the CPR customization process provides the subscriber with the ability to set the CPR, if desirable, to block all privacy calls or, conversely, to forward all privacy calls to voice mail. Alternatively, calls can be forwarded to a plurality of preset destinations. That is, the CPRs may contain tables having several call forwarding destinations, each having CPN numbers associated therewith.

Figure 4B:
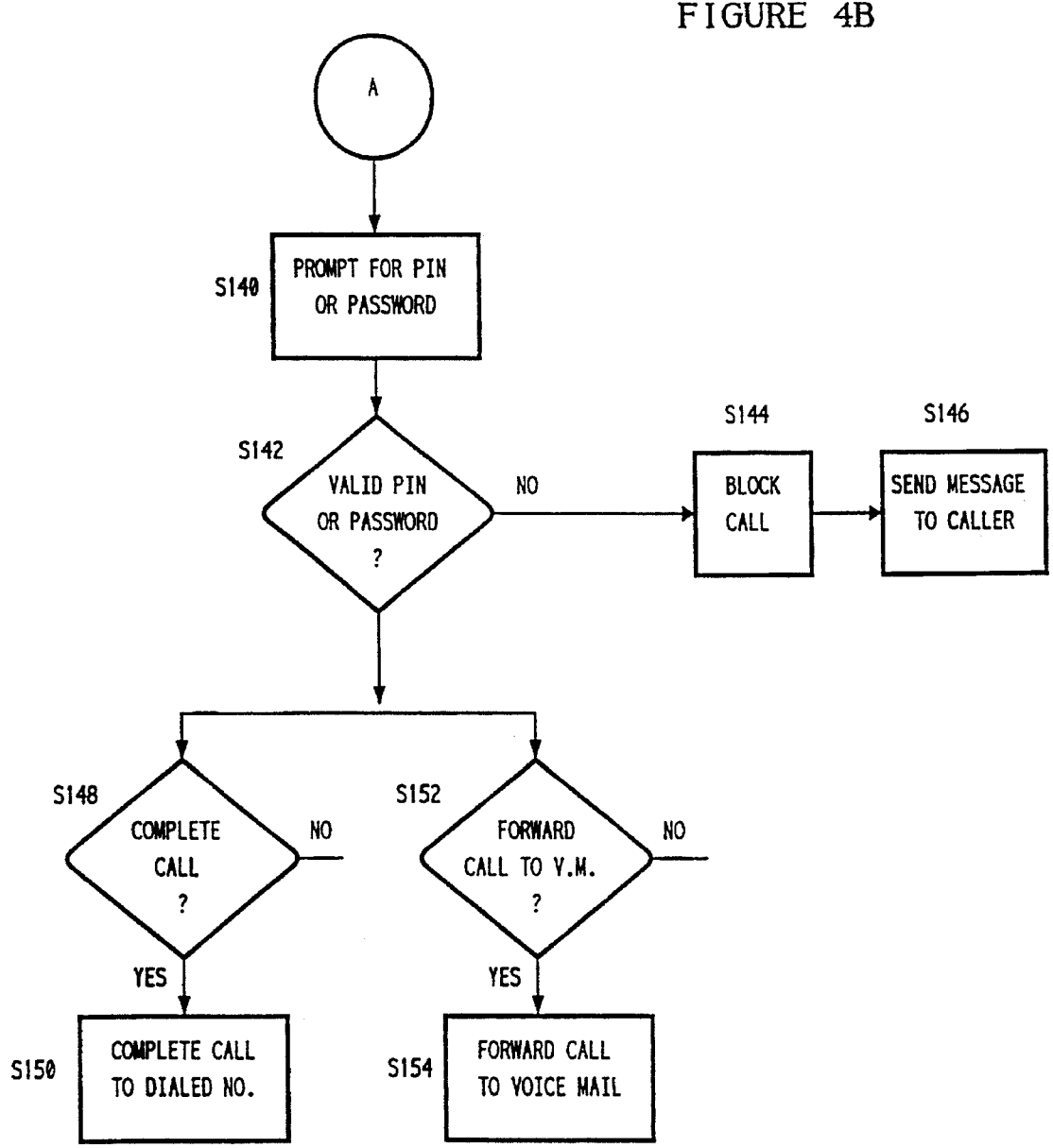
FIG. 4B is a flow chart in furtherance of FIG. 3, showing call processing operation on the basis of matching a PIN or password with a table in the called party CPR.

The CPR table can be populated with PIN numbers or passwords instead of, or in addition to, CPN numbers. The flow chart of FIG. 4B shows at step S140, which follows point A in FIG. 3, a prompt transmitted to the caller either to enter a PIN number or speak a password. Step S142 determines whether the PIN or password is valid, i.e., whether there is a match with an entry stored in the CPR table. In the absence of a valid PIN or password the call will be blocked, step S144, and a message sent to the caller, step S146.

If the PIN or password is valid, either of two distinct treatments is provided for handling the call. A determination may be made at step S148 that the PIN or password is associated in the CPR table with a call completion function. If so, at step S150 the call will be completed to the dialed number. Alternatively, a determination will be made at step S152 that the valid PIN or password is associated in the CPR table with a call forward function, such as to the called party's voice mail. If so, the call will be so forwarded at step S154.

Figure 4C:
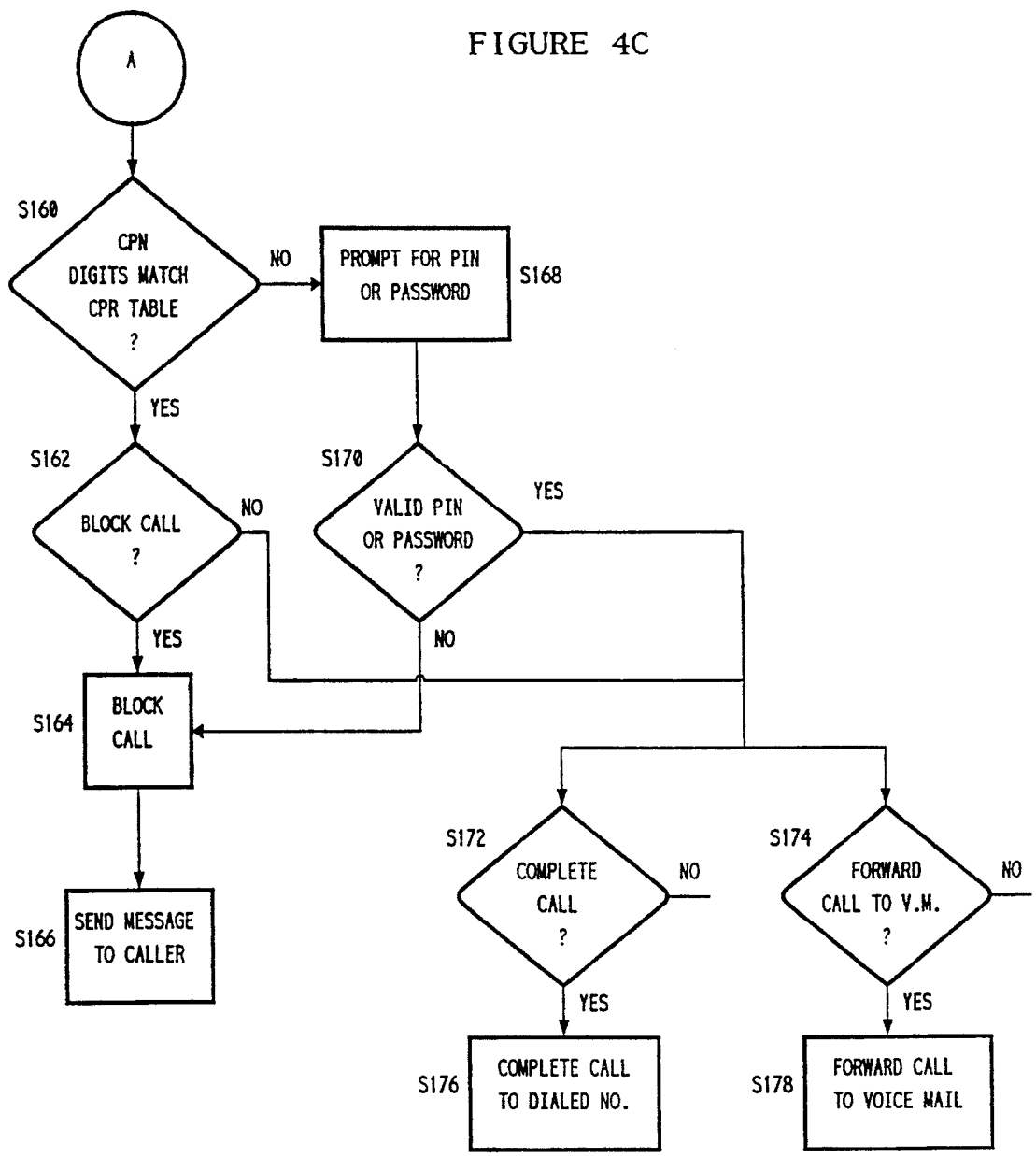
FIG. 4C is a flow chart in furtherance of FIG. 3, showing operation on combined bases of CPN, PIN or password matching.

FIG. 4C depicts operation wherein the called party's CPR table may contain a list of CPNs as well as PIN and password entries. Following point A, if it is determined at step S160 that the CPN digits match the called party's CPR table, step S162 checks whether the CPN is associated with a call block function. If so, the call will be blocked at step S164 and the caller is sent a message to that effect at step S166.

If step S160 determines that the CPN does not match the CPR table, the caller is prompted for a PIN entry or spoken password at step S168. If step S170 determines that the PIN or password is not valid, then the call will be blocked and message sent at steps S164 and S166, respectively.

In the event that step S162 determines that the matched CPN does not correspond to a block function and in the event that step S170 determines that the entered PIN or spoken password is valid, the PIN, password or CPN is compared with the CPR table to determine whether there is an association with a call completion at step S172 or call forward function at step S174. One of these determinations will yield a positive result. Step S176 depicts call completion to the dialed number. Step S178 illustrates call forwarding to the called party's voice mail, although any alternative destination may be listed in the CPR table.

Figure 4D:
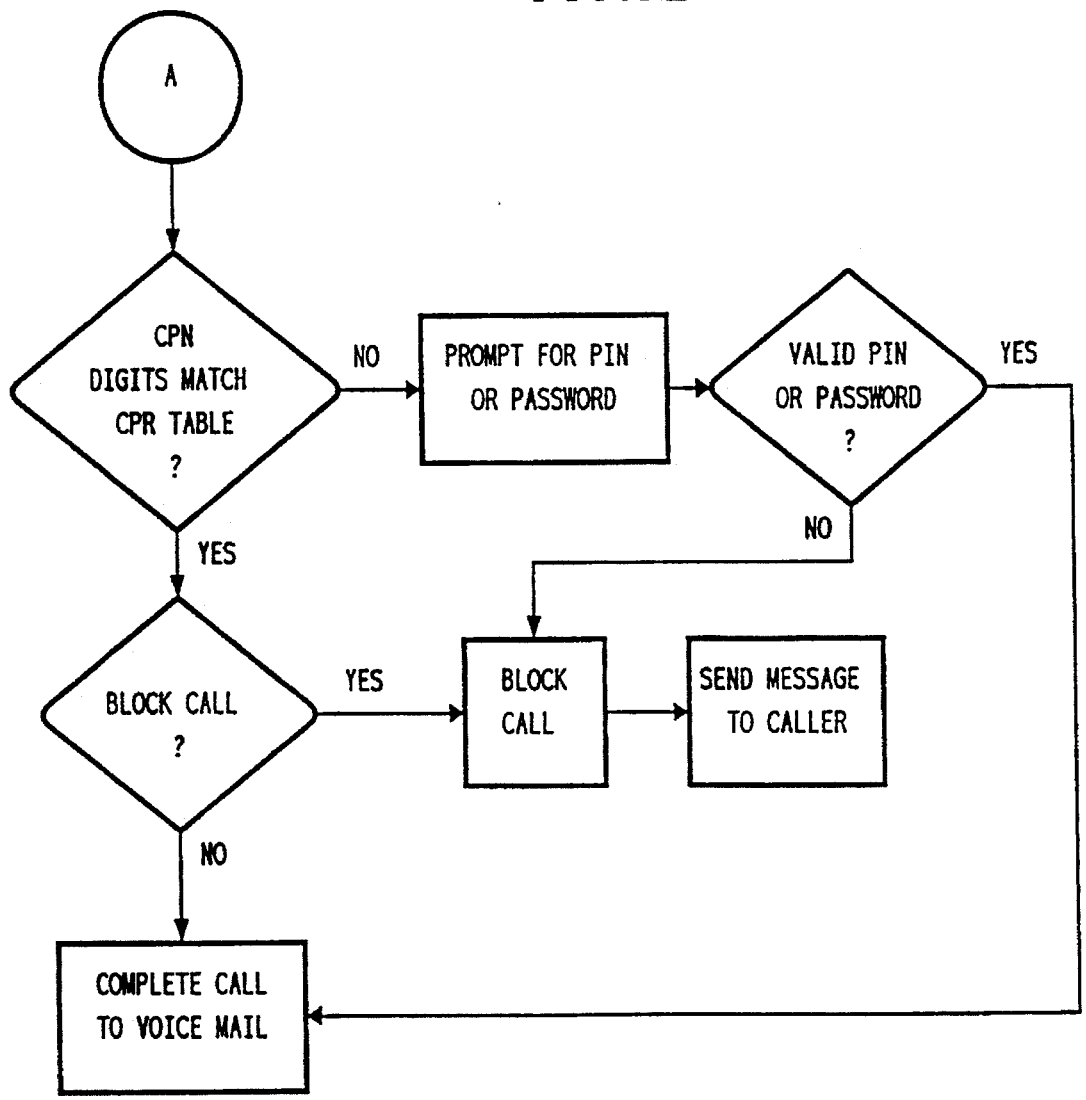
FIG. 4D is a flow chart in furtherance of FIG. 3, showing of operation for calls directed to voice mail.

FIG. 4D shows operation for calls that may be directed initially either to a subscriber's line or voice mail platform. Operation is similar to that of FIG. 4C in that it is possible to include any combination of CPN table, PIN or password entries in the CPR. Operation differs in that no association is made in the CPR with a call forwarding function. This embodiment provides for either call completion or call block. The dialed destination is illustrated in the figure as a voice mail platform.

Figure 5:
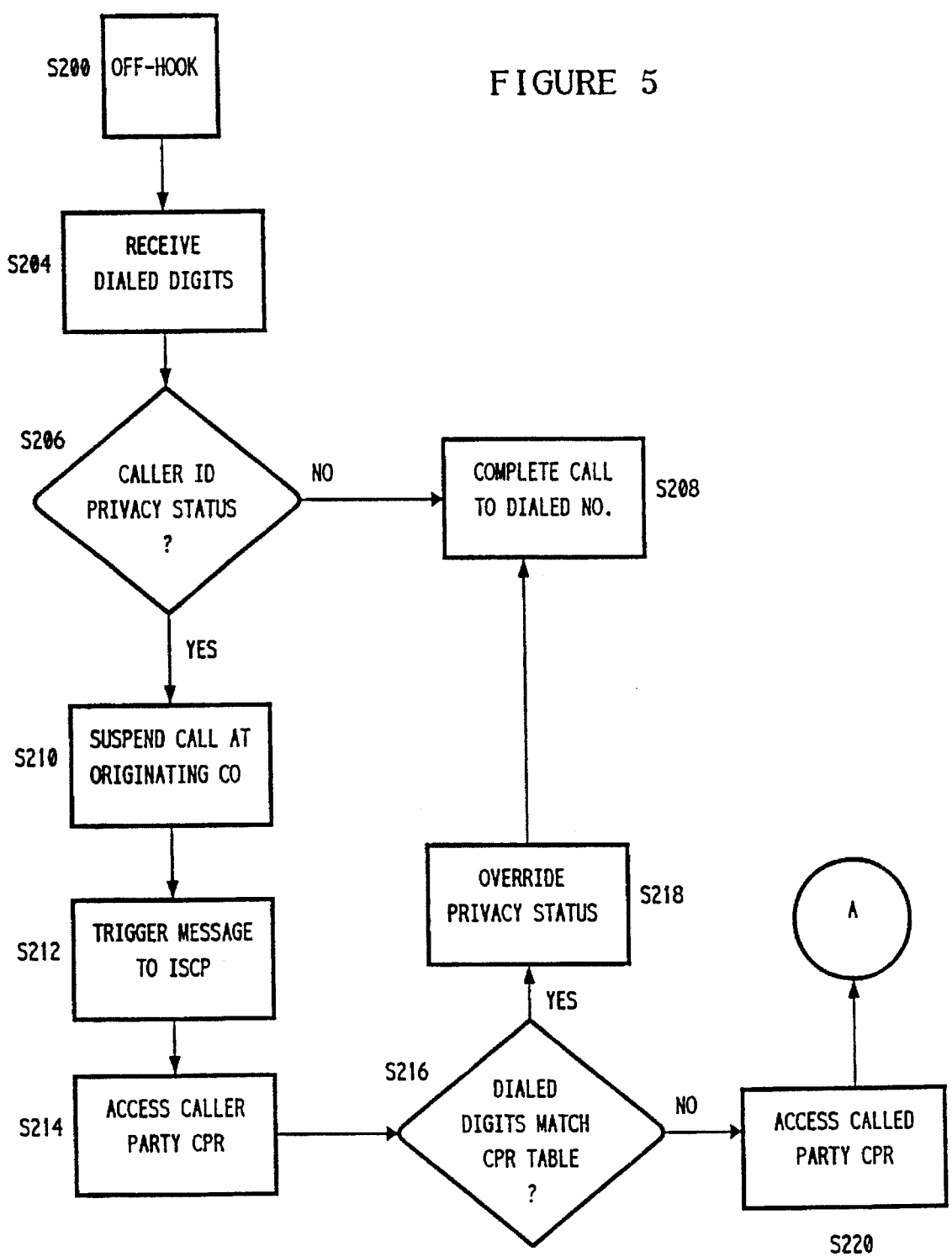
FIG. 5 is a flow chart showing a comparison of dialed digits with the caller party CPR table to override privacy status or, in the alternative, to process calls in accordance with FIGS. 4A, 4B or 4C.

FIG. 5 depicts operation wherein the caller party CPR is accessed during privacy status calls. In this embodiment, a subscriber to caller ID privacy may list exceptions in the CPR table. For calls dialed to destinations listed in the table, the privacy status will be overridden. Such calls will then be completed as dialed in the conventional manner. For those calls, the caller, who has opted to relinquish privacy, need not be concerned that the called party has required caller ID to complete the call. For other calls, the privacy status will be maintained.

Off-hook is sensed at the originating CO at step S200. At steps S204 and S206, the CO receives the dialed digits and determines whether a privacy status has been set for the caller line. If no privacy status exists, then the call is completed in the standard manner at step S208. If a privacy status is found, the call will be suspended by the originating CO at step S210, a message being triggered and transmitted to the ISCP at step S212. At the ISCP the caller party CPR is accessed, step S214, and the dialed digits compared with the caller's CPR table, step S216. If a match is found, a message is sent to the originating office to override the privacy status for the call, step S218, and the call will be completed at step S208. If no match is found in step S216, the called party CPR is accessed at step S220 and processing continues in the manner described with respect to any of FIGS. 4A through 4D.

In this disclosure there is shown and described only the preferred embodiments of the invention and but a few examples of its versatility. It is to be understood that the invention is capable of use in various other combinations and environments and is capable of changes or modifications within the scope of the inventive concept as expressed herein. As an example only, in the operation of FIG. 5, if no privacy override is indicated at step S216, the call thereafter may be processed in conventional manner without being subject to the additional processing steps of the operation of FIGS. 4A through 4D.

I claim:

1. In a telephone communications system including a plurality of subscriber telephone lines, each coupled to an associated telephone switching facility in a communications network, and a service control point remotely located from said telephone lines and associated switching facilities, a method for controlling call processing of a telephone call placed from a caller line and addressed to a called line destination comprising the steps of:

(a) determining whether transmission of caller line identification has been designated to be blocked for calls placed from the caller line at a first switch where blocked status of the caller line is detected;

(b) in response to an affirmative block determination in step (a), accessing said service control point to obtain information for processing the call; and (c) directing the telephone switching facility associated with the caller line to process the call in accordance with the information obtained from the service control point in step (b).

2. A method as recited in claim 1, further including a step of completing the call to the called line destination address in the absence of an affirmative block determination in step (a).

3. A method as recited in claim 1, wherein said step of determining comprises recognizing a privacy trigger in the caller line associated switching facility; and said step of accessing comprises sending a request message to said service control point in response to the trigger.

4. A method as recited in claim 3, wherein said switching control point comprises a data base containing call processing records associated with respective subscriber telephone lines; and said step of accessing further comprises reading the call processing record of the called line subscriber.

5. A method as recited in claim 4, further including a step of blocking completion of the call at the caller line switching facility in response to the direction of step (c).

6. A method as recited in claim 4, further including a step of completing the call to an alternate destination defined by the call processing record of the called line subscriber in response to the direction of step (c).

7. A method as recited in claim 6, wherein said alternate destination is a voice mail facility associated with the called line.

8. A method as recited in claim 6, wherein the step of completing the call is made in accordance with the identity of the caller line.

9. A method as recited in claim 4, further including a step of completing the call to the called line destination in response to receipt of a password from the caller line that corresponds to a password stored in the call processing record of the called line subscriber.

10. A method as recited in claim 4, further including a step of completing the call to the called line destination in response to receipt of a PIN number input at the caller line that corresponds to a PIN number stored in the call processing record file of the called line subscriber.

11. A method as recited in claim 3, wherein said switching control point comprises a data base containing call processing records associated with respective subscriber telephone lines;

said step of accessing further comprises reading the call processing record of the caller line subscriber and overriding the blocked caller line identification transmission status for the call if the called line destination number corresponds to a number in the caller line call processing record; and further including a step of completing the call to the called line destination address.

12. In a communication network including a plurality of interconnected central office switching systems each at a different location, each of said central office switching systems connected to a plurality of local communication lines, a voice network portion comprising voice communication paths for interconnecting any of the central office switching systems, a common channel signaling network portion comprising signaling paths interconnecting said central office switching systems through at least one signal transfer point and at least one integrated services control point including a data base, a method for controlling call processing comprising the steps of:

setting a caller line identification feature at a central office switching system for the local communication lines connected thereto that subscribe to an incoming caller line identification feature;

setting a caller line identification block configuration at a central office switching system for the local communication lines connected thereto the subscribers of which have refused outgoing caller line identification transmission to called parties;

setting an initiation trigger at a central office switching system in association with each line having said block configuration for activation in response to initiation of a call from that line;

creating call processing records for respective network subscribers in said data base, the call processing records containing information specifying the manner in which incoming calls that have blocked caller line identification are to be processed;

activating an initiation trigger in response to an off hook condition on the line associated with the trigger;

formulating a trigger message in response to the activation of the trigger;

transmitting said trigger message through the common channel signaling network to the integrated services control point;

accessing the call processing record of the respective called subscriber; and processing the call in accordance with the information contained in the accessed call processing record.

13. A method as recited in claim 12, wherein the accessed call processing record specifies a plurality of different call processing modes, including call blocking and call forwarding, corresponding to at least one criterion established by the respective network subscriber.

14. A method as recited in claim 13, wherein said one criterion is based on the identity of the calling line.

15. In a communication network including a plurality of interconnected central office switching systems each at a different location, each of said central office switching systems connected to a plurality of local communication lines, a voice network portion comprising voice communication paths for interconnecting any of the central office switching systems, a common channel signaling network portion comprising signaling paths interconnecting said central office switching systems through at least one signal transfer point and at least one integrated services control point including a data base, a method for controlling call processing comprising the steps of:

setting a caller line identification block configuration at a central office switching system for the local communication lines connected thereto the subscribers of which have refused outgoing caller line identification transmission to called parties;

setting an initiation trigger at a central office switching system in association with each line having said block configuration for activation in response to initiation of a call from that line;

creating call processing records in said data base for respective network subscribers with caller line identification block, the call processing records specifying one or more line addresses;

activating an initiation trigger in response to an off hook condition on the line associated with the trigger and receiving a called party address signaling sequence from that line;

formulating a trigger message in response to the activation of the trigger;

transmitting said trigger message through the common channel signaling network to the integrated services control point;

accessing the call processing record of the respective called subscriber;

determining whether said called party address corresponds to a line address in the accessed call processing record; and overriding the caller line identification block configuration for the call in response to a positive correspondence determination.

* * * * *